(12) United States Patent
Chou et al.

(10) Patent No.: US 11,403,243 B2
(45) Date of Patent: Aug. 2, 2022

(54) MAINBOARD OF A SERVER AND METHOD OF POPULATING DIMM SLOTS OF A MAINBOARD

(71) Applicant: LENOVO Enterprise Solutions (Singapore) PTE. LTD., New Tech Park (SG)

(72) Inventors: Chun-Hsiang Chou, Taipei (TW); YunLe Wang, Shanghai (CN); Chao-Hung Lu, Taipei (TW); Shih-Ming FanChiang, Taipei (TW)

(73) Assignee: LENOVO Enterprise Solutions (Singapore) PTE. LTD., New Tech Park (SG)

( * ) Notice: Subject to any disclaimer, the term of this patent is extended or adjusted under 35 U.S.C. 154(b) by 311 days.

(21) Appl. No.: 16/456,213

(22) Filed: Jun. 28, 2019

(65) Prior Publication Data
US 2020/0004704 A1    Jan. 2, 2020

(30) Foreign Application Priority Data
Jun. 30, 2018    (CN) .......................... 201810703294.2

(51) Int. Cl.
*G06F 13/16*    (2006.01)
*G06F 11/32*    (2006.01)
*G06F 13/40*    (2006.01)

(52) U.S. Cl.
CPC ........ *G06F 13/1694* (2013.01); *G06F 11/325* (2013.01); *G06F 13/1657* (2013.01); *G06F 13/4081* (2013.01)

(58) Field of Classification Search
CPC ............... G06F 13/1694; G06F 11/325; G06F 13/1657; G06F 13/4081
USPC ........................................................ 710/104
See application file for complete search history.

(56) References Cited

U.S. PATENT DOCUMENTS

| | | | |
|---|---|---|---|
| 2005/0246517 A1* | 11/2005 | Volentine ............ | G06F 13/4234 713/1 |
| 2007/0220228 A1* | 9/2007 | Huang ................ | G06F 13/1694 711/170 |
| 2008/0082767 A1* | 4/2008 | Nulkar ................. | G06F 3/0607 711/156 |
| 2008/0313312 A1* | 12/2008 | Flynn .................... | G06F 12/123 709/221 |
| 2011/0205078 A1* | 8/2011 | Hua ...................... | G06F 11/321 340/691.1 |
| 2012/0001763 A1* | 1/2012 | Billick ..................... | G06F 9/00 340/635 |
| 2013/0179672 A1* | 7/2013 | Lee ........................ | G06F 9/4401 713/2 |
| 2018/0081837 A1* | 3/2018 | Heiberg ................. | G06F 13/36 |

(Continued)

*Primary Examiner* — Titus Wong
(74) *Attorney, Agent, or Firm* — Kunzler Bean & Adamson; Bruce R. Needham

(57) ABSTRACT

A mainboard includes a baseboard management controller (BMC), a plurality of dual in-line memory module (DIMM) slots, and a plurality of visual indicators each associated with a respective of the plurality of DIMM slots. The BMC is adapted to determine a DIMM population rule for populating the plurality of DIMM slots based on information relating to at least one DIMM, and the visual indicators are adapted to visually indicate a DIMM slot amongst the plurality of DIMM slots to which the at least one DIMM is to be installed in accordance with the DIMM population rule.

20 Claims, 3 Drawing Sheets

(56) References Cited

U.S. PATENT DOCUMENTS

2018/0321845 A1\* 11/2018 Mutnury ................. G06F 3/061
2019/0195948 A1\* 6/2019 Kaur ................ G01R 31/31917

\* cited by examiner

MAINBOARD OF A SERVER AND METHOD OF POPULATING DIMM SLOTS OF A MAINBOARD

CROSS-REFERENCE TO RELATED APPLICATIONS

This patent application claims priority to China Patent Application No. 201810703294.2 filed on Jun. 30, 2018 for Chun-Hsiang Chou, et al., the entire contents of which are incorporated herein by reference for all purposes.

FIELD

The subject matter disclosed herein relates to a mainboard with mechanism for assisting populating dual in-line memory module (DIMM) slots in the mainboard, and a method of populating DIMM slots of a mainboard.

BACKGROUND

Conventionally, to install DIMMs into DIMM slots of a mainboard, a user has to remove the alternating current (AC) power cable. It is thus not possible to carry out DIMM installation by "hot-swapping". Moreover, there are a large variety of DIMM population rules for different systems. In addition to the fact that one finds it difficult to locate the correct population rule for a specific mainboard, a user does not know whether the installation matches the correct population rule.

It is thus an object of the present invention to provide a mainboard and a method in which the aforesaid shortcomings are mitigated or at least to provide a useful alternative to the trade and public.

BRIEF SUMMARY

According to an embodiment of the present invention, there is provided a mainboard including a baseboard management controller (BMC), a plurality of dual in-line memory module (DIMM) slots, and a plurality of visual indicators each associated with a respective of the plurality of DIMM slots. The BMC is adapted to determine a DIMM population rule for populating the plurality of DIMM slots based on information relating to at least one DIMM, and the visual indicators are adapted to visually indicate a DIMM slot amongst the plurality of DIMM slots to which the at least one DIMM is to be installed in accordance with the DIMM population rule.

According to another embodiment of the present invention, there is provided a server including a mainboard including a baseboard management controller (BMC), a plurality of dual in-line memory module (DIMM) slots, and a plurality of visual indicators each associated with a respective of the plurality of DIMM slots. The BMC is adapted to determine a DIMM population rule for populating the plurality of DIMM slots based on information relating to at least one DIMM, and the visual indicators are adapted to visually indicate a DIMM slot amongst the plurality of DIMM slots to which the at least one DIMM is to be installed in accordance with the DIMM population rule.

According to yet another embodiment of the present invention, there is provided a method of populating a plurality of dual in-line memory module (DIMM) slots of a mainboard, including providing a mainboard with a baseboard management controller (BMC), a plurality of DIMM slots, and a plurality of visual indicators each associated with a respective of the plurality of DIMM slots. The BMC determines a DIMM population rule for populating the plurality of DIMM slots based on information relating to at least one DIMM, and the visual indicators visually indicating a DIMM slot amongst the plurality of DIMM slots to which the at least one DIMM is to be installed in accordance with the DIMM population rule.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
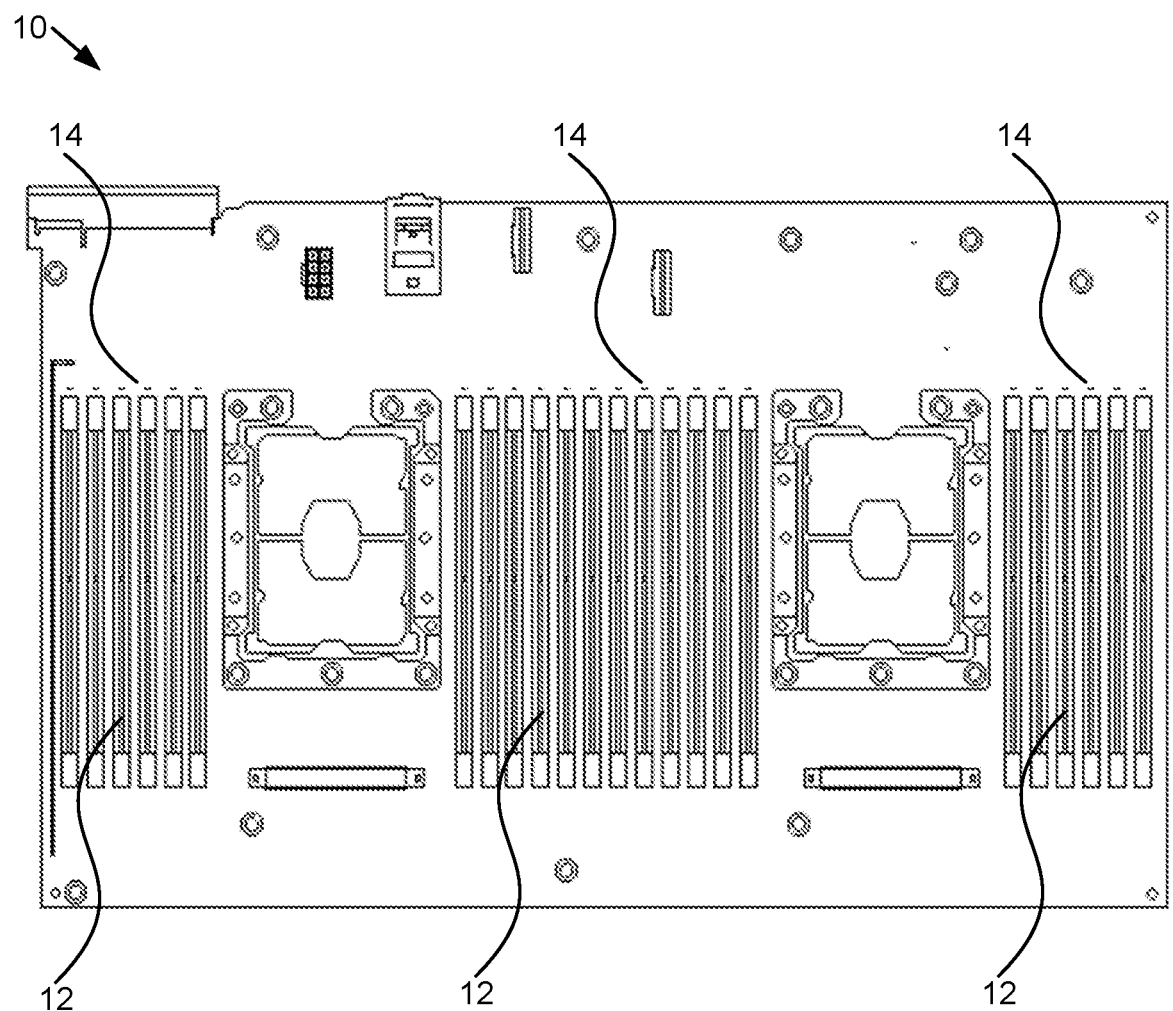
FIG. 1 is a schematic block diagram of a mainboard according to an embodiment of the present invention.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

A mainboard populating a plurality of dual in-line memory module (DIMM) slots includes a baseboard management controller (BMC), a plurality of DIMM slots and a plurality of visual indicators each associated with a respective one of the plurality of DIMM slots. The BMC is adapted to determine a DIMM population rule for populating the plurality of DIMM slots based on information relating to the least one DIMM, and the visual indicators are adapted to visually indicate a DIMM slot amongst the plurality of DIMM slots to which the at least one DIMM is to be installed in accordance with the DIMM population rule.

In some embodiments, the BMC is adapted to check whether the plurality of DIMM slots are populated by DIMMs in accordance with the DIMM population rule. In other embodiments, in response to a positive checking result of the BMC, the plurality of visual indicators are adapted to visually indicate completion of populating the plurality of DIMM slots in accordance with the DIMM population rule. In other embodiments, the mainboard includes a field-programmable gate array (FPGA) operable by the BMC to determine presence of a DIMM at least one of the plurality of DIMM slots and/or location information of at least one of the plurality of DIMM slots.

In some embodiments, the information relating to the at least one DIMM includes quantity and/or type of the at least one DIMM. In other embodiments, in response to reception of the information relating to the at least one DIMM, the BMC is adapted to cause one of the visual indicators to visually indicate the DIMM slot amongst the plurality of DIMM slots to which the at least one DIMM is to be installed. In other embodiments, in response to the BMC determining that the DIMM population rule is invalid, the BMC is adapted to cause the visual indicators to visually indicate that the DIMM population rule is invalid.

An apparatus populating a plurality of dual in-line memory module (DIMM) slots includes an electronic device, a processor and a mainboard. The mainboard is in the electronic device and includes the processor. The mainboard includes a BMC, a plurality of DIMM slots coupled to the processor and a plurality of visual indicators each associated with a respective one of the plurality of DIMM slots. The BMC is adapted to determine a DIMM population rule for populating the plurality of DIMM slots based on information relating to at least one DIMM, and the visual indicators are adapted to visually indicate a DIMM slot amongst the plurality of DIMM slots to which the at least one DIMM is to be installed in accordance with the DIMM population rule.

In some embodiments, the electronic device is a server. In other embodiments, the apparatus includes DIMMs that are installable to and/or removable from the plurality of DIMM slots, the DIMMs in communication with the processor.

A method populating a plurality of DIMM slots of a mainboard includes providing a mainboard with a BMC, a plurality of DIMM slots, and a plurality of visual indicators each associated with a respective DIMM slot of the plurality of DIMM slots. The method includes determining, with the BMC, a DIMM population rule for populating the plurality of DIMM slots based on information relating to at least one DIMM, and visually indicating, with the visual indicators, a DIMM slot amongst the plurality of DIMM slots to which the at least one DIMM is to be installed in accordance with the DIMM population rule.

In some embodiments, the method includes the BMC checking whether the plurality of DIMM slots are populated by DIMMs in accordance with the DIMM population rule. In other embodiments, in response to a positive checking result of the BMC, the plurality of visual indicators visually indicate completion of populating the plurality of DIMM slots in accordance with the DIMM population rule. In other embodiments, the method includes the BMC operating a field-programmable gate array (FPGA) to determine presence of a DIMM at least one of the plurality of DIMM slots, or location information of at least one of the plurality of DIMM slots. In other embodiments, the information relating to the at least one DIMM includes quantity and/or type of the at least one DIMM. In other embodiments, in response to receiving the information relating to the DIMM, the method includes the BMC causing one of the visual indicators to visually indicate the DIMM slot amongst the plurality of DIMM slots to which the DIMM is to be installed.

In some embodiments, information relating to the at least one DIMM is provided to the BMC by scanning. In other embodiments, the scanning is carried out by operating a barcode reader. In other embodiments, in response to the BMC determining that the DIMM population rule is invalid, the method includes the one or more visual indicators visually indicating that the DIMM population rule is invalid. In other embodiments, the method is carried out in S5 mode of the plurality of DIMM slots.

A mainboard according to an embodiment of the present invention is shown in FIG. 1, and generally designated as 10. As shown in FIG. 1, the mainboard 10 includes a number of elongate dual in-line memory module (DIMM) slots 12 which run parallel to one another. Adjacent a longitudinal end of each of the DIMM slots 12 is provided an associated light-emitting diode (LED) 14. Such LEDs 14 are originally provided to provide visual indication of error associated with the respective DIMM slot 12.

Figure 2:
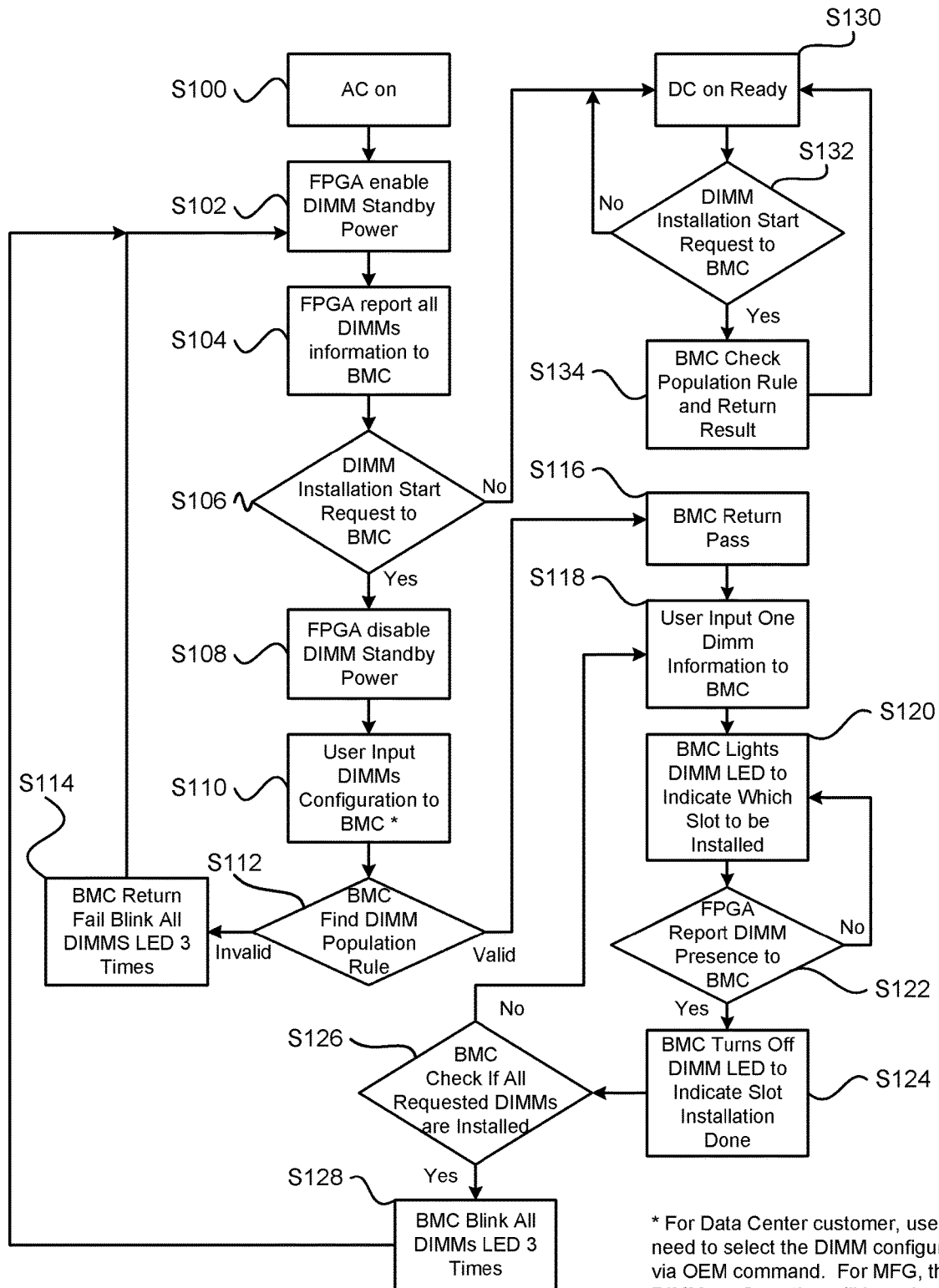
FIG. 2 is a flowchart diagram illustrating one embodiment of a method of populating DIMM slots of the mainboard of FIG. 1 according to an embodiment of the present invention.
Figure 3:
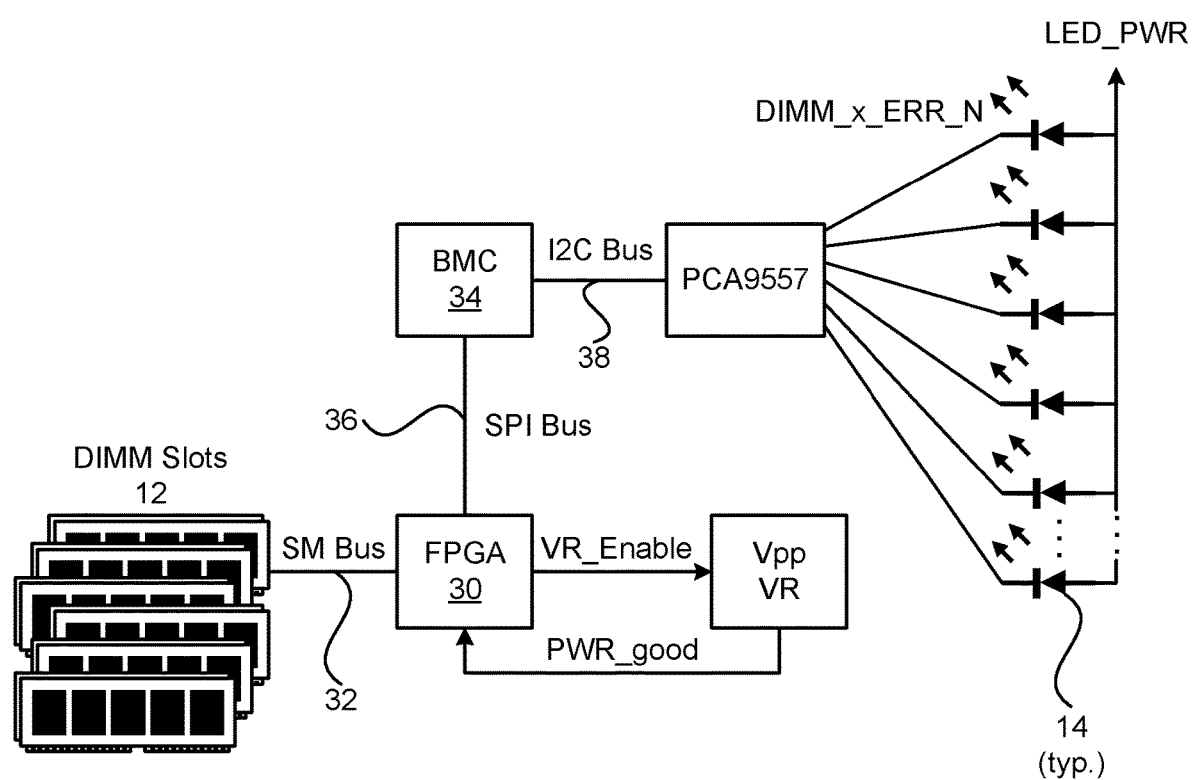
FIG. 3 is a schematic block diagram of one embodiment of various components of the mainboard of FIG. 1.

When carrying out a method of populating the DIMM slots 12 of the mainboard 10 according to an embodiment of the present invention, and as shown in FIGS. 2 and 3, a user connects (S100) a server with the mainboard 10 to an AC power supply. The server (and thus the mainboard 10) is then in S5 mode (or so-called "Soft-Off state"), in which the system fully shuts down without a hibernation.

The mainboard 10 includes a field-programmable gate array (FPGA) 30 which is connected with the DIMM slots 12 via a system management (SM) Bus 32. The FPGA 30 then enables DIMM standby power (S102). The FPGA 30 reports all available DIMM's information (S104) to a baseboard management controller (BMC) 34 of the mainboard 10 via an serial peripheral interface (SPI) Bus 36. If a user then starts a DIMM Installation Start Request to the BMC 34 (S106), the FPGA then disables the DIMM standby power (S108). The user then inputs DIMMs Configuration to the BMC 34 (S110). In some embodiments, for data center customers a user selects the DIMM configuration via original equipment manufacturer ("OEM") command. In other embodiments, for a manufacturer the DIMM configuration is selected by a customer's order. The BMC 34 then finds the correct DIMM population rule (S112). If no appropriate DIMM population rule can be found, the BMC 34 provides a FAIL signal by causing all LEDs 14 to blink three times (S114). The FPGA 30 then enables DIMM standby power (S102) again. If, on the other hand, in (S112), the BMC 34 finds a correct DIMM population rule, the BMC 34 returns a "PASS" signal (S116). It should be appreciated that the DIMM population rule relates to an order of introducing one or more new DIMMs to the corresponding one or more DIMM slots 12.

The user then inputs information relating to one DIMM to the BMC 34 (S118). Such may be carried out by using a barcode scanner (or other optical character readers) to scan DIMM information on the DIMM for subsequent input to the BMC 34. In other embodiments, the DIMM information on the DIMM is entered manually via an input device, such as a keyboard, mouse, microphone, etc. Upon reception of the DIMM information of the one DIMM, the BMC 34 then lights the LED 14 associated with the DIMM slot 12 to which the DIMM is to be installed (S120). The FPGA 30 then checks on whether the DIMM is installed to the correct DIMM slot 12 and reports to the BMC 34 (S122). If no DIMM presence is detected in the correct DIMM slot 12 (i.e. the DIMM slot 12 whose associated LED 14 is being lit), the LED 14 continues to be lit. If, on the other hand, presence of a DIMM in the correct DIMM slot 12 is detected, such will be reported by the FPGA 30 to the BMC 34, whereupon the BMC 34 switches off the associated LED 14 to indicate that the proper installation of a DIMM to this DIMM slot 12 is completed (S124). The BMC 34 then checks if all requested DIMMs are installed (S126). If, yes, the BMC 34 will cause all the LEDs 14 to blink three times or similar signal (i.e. fast blinking, blink twice, etc.) to signify completion of the DIMM population process (S128), whereupon the FPGA enables DIMM standby power (S102) again. If, upon checking, not all requested DIMMs are installed (S126), the user will then input information relating to another DIMM to the BMC 34 (S118), and the procedure continues until all the requested DIMMs are installed (S126).

In (S106), if no DIMM Installation Start Request is sent to the BMC 34, direct current (DC) power will be kept on (S130) to check whether any DIMM Population Check Request is sent to the BMC 34 (S132). If a DIMM Population Check Request is sent to the BMC 34 (S132), the BMC 34 will check the population rule and return a result to the requester (S134). The BMC 34, in some embodiments, returns to step S108 to add additional DIMMs.

While the method described with regard to FIG. 2 above describes how an end user populates DIMM slots 12 of a mainboard 10, for Data Center customers, instead of carrying out (S110) in FIG. 2, they instead have to select the DIMM configuration via OEM commands. The DIMM configuration comprises information, such as the number of DIMM which the new configuration comprises and/or type of the new DIMM(s) to be added e.g. flash DIMMs and non-volatile dual in-line memory modules (NVDIMMs). In particular, DIMM and OEM commands for DIMM installation will be provided to the Data Center customer. The customer then enables DIMM installation mode via OEM command. The customer selects DIMM population via OEM command, and inputs DIMM information via OEM command. The BMC 34 will then light the LED 14 associated with the correct DIMM slot 12 to which the DIMM is to be installed. When all the DIMM slots 12 are correctly installed, the BMC 34 will then cause the LEDs 14 to provide confirmatory visual indication, e.g. by all LEDs 14 blinking three times, blinking two times, flashing quickly, etc.

As for manufacturers, instead of carrying out (S110) in FIG. 2, the DIMM configuration will be selected by customer's order. In particular, when a manufacturer assembles the server in factories, an operator will first enable DIMM installation mode, then selects a DIMM population rule based on the DIMM configuration. The operator, in some embodiments, then uses a barcode scanner (or other optical character readers) to scan DIMM information to be transmitted to the BMC 34 in the mainboard being assembled. The BMC 34 will then light the LED 14 associated with the correct DIMM slot 12 to which the DIMM is to be installed. When all the DIMM slots 12 are correctly installed, the BMC 34 will then cause the LEDs 14 to provide confirmatory visual indication, e.g. by all LEDs 14 blinking two times, three times, four times, or other visual indicator. When the assembled mainboard 10/server is to undergo quality checking, the operator will send instructions to the BMC 34 to check the DIMM population, and the BMC 34 will return result of the DIMM population check.

The BMC 34 has the following features:
(a) the BMC 34 controls DIMM standby power via the FPGA 30,
(b) the BMC 34 renews DIMM serial presence detect (SPD)/Location information via the FPGA 30 after enabling DIMM standby power; in particular, the SPD indicates presence of a DIMM at the corresponding DIMM slot,
(c) the BMC 34 compares DIMM configuration request and DIMM population rule to find the proper installation MAP,
(d) the BMC 34 compares DIMM SPD/Location information and installation MAP calculated by the BMC 34 to indicate where the next DIMM slot 12 is to be populated by using the existing DIMM error LEDs 14, and
(e) the BMC 34 checks if the existing DIMM installation can meet DIMM population rule by using the DIMM SPD/Location information.

FIG. 3 is a schematic block diagram of one embodiment of various components of the mainboard of FIG. 1. DIMM slots 12 of a mainboard 10 are connected to the FPGA 30 via an SM bus 32. The FPGA 30 is connected to the BMC 34 via a SPI bus 36, which drives LEDs 14 to turn on and off. In some embodiments, the BMC 34 controls the LEDs 14 using a PCA9557 chip that connects to each LED 14 and is controlled via an I2C bus 38. In some embodiments, the FPGA 30 sends a signal (e.g. VR_Enable) to turn on DC power (e.g. VPP VR), which returns a signal indicating that the DC power is on (e.g. PWR_good). In some embodiments, the FPGA 30 sends the signal (e.g. VR_enable) to turn on power to the DIMMs and LEDs 14. In other embodiments, the FPGA 30 determines that power is on by measuring power at a power input. One of skill in the art will recognize other ways that an FPGA 30 and/or BMC 34 can control LEDs 14 and determine information about DIMMs mounted in DIMM slots 12.

It should be understood that the above only illustrates how exemplary embodiments may be carried out, and that various modifications and/or alterations may be made thereto without departing from the spirit of the invention. It should also be understood that certain features of the invention, which are, for clarity, described in the context of separate embodiments, may be provided in combination in a single embodiment. Conversely, various features of the invention which are, for brevity, described in the context of a single embodiment, may also be provided separately or in any appropriate sub-combinations.

What is claimed is:

1. A mainboard comprising:
a baseboard management controller (BMC);
a plurality of dual in-line memory module (DIMM) slots; and
a plurality of visual indicators each associated with a respective one of the plurality of DIMM slots,
wherein the BMC is adapted to, in response to a DIMM installation request received from a user:
receive user input comprising information about at least one DIMM to be installed into a DIMM slot of the plurality of DIMM slots; and
determine a DIMM population rule for populating the plurality of DIMM slots based on the information received from the user input relating to the at least one DIMM to be inserted into a DIMM slot of the plurality of DIMM slots, and
wherein the visual indicators are adapted to visually indicate a DIMM slot amongst the plurality of DIMM slots to which the at least one DIMM is to be installed in accordance with the DIMM population rule.

2. The mainboard of claim 1, wherein the BMC is adapted to check whether the plurality of DIMM slots are populated by DIMMs in accordance with the DIMM population rule.

3. The mainboard of claim 2, wherein in response to a positive checking result of the BMC, the plurality of visual indicators are adapted to visually indicate completion of populating the plurality of DIMM slots in accordance with the DIMM population rule.

4. The mainboard of claim 1, further including a field-programmable gate array (FPGA) operable by the BMC to determine presence of a DIMM, at least one of the plurality of DIMM slots and/or location information of at least one of the plurality of DIMM slots.

5. The mainboard of claim 1, wherein the information relating to the at least one DIMM includes quantity and/or type of the at least one DIMM.

6. The mainboard of claim 1, wherein in response to reception of the information relating to the at least one DIMM, the BMC is adapted to cause one of the visual indicators to visually indicate the DIMM slot amongst the plurality of DIMM slots to which the at least one DIMM is to be installed.

7. The mainboard of claim 1, wherein in response to the BMC determining that the DIMM population rule is invalid, the BMC is adapted to cause the visual indicators to visually indicate that the DIMM population rule is invalid.

8. An apparatus comprising:
an electronic device;
a processor; and
a mainboard, the mainboard in the electronic device and comprising the processor, the mainboard comprising:
a baseboard management controller (BMC);
a plurality of dual in-line memory module (DIMM) slots coupled to the processor; and
a plurality of visual indicators each associated with a respective one of the plurality of DIMM slots,
wherein the BMC is adapted to, in response to a DIMM installation request received from a user:
receive user input comprising information about at least one DIMM to be installed into a DIMM slot of the plurality of DIMM slots; and
determine a DIMM population rule for populating the plurality of DIMM slots based on the information relating to the at least one DIMM to be inserted into a DIMM slot of the plurality of DIMM slots, and
wherein the visual indicators are adapted to visually indicate a DIMM slot amongst the plurality of DIMM slots to which the at least one DIMM is to be installed in accordance with the DIMM population rule.

9. The apparatus of claim 8, wherein the electronic device is a server.

10. The apparatus of claim 8, further comprising DIMMs that are installable to and/or removable from the plurality of DIMM slots, the DIMMs in communication with the processor.

11. A method comprising:
providing a mainboard with a baseboard management controller (BMC), a plurality of dual in-line memory module (DIMM) slots, and a plurality of visual indicators each associated with a respective DIMM slot of the plurality of DIMM slots;
receiving, with the BMC, a DIMM installation request from a user;
receiving, with the BMC, user input comprising information about at least one DIMM to be installed into a DIMM slot of the plurality of DIMM slots;
determining, with the BMC, a DIMM population rule for populating the plurality of DIMM slots based on the information received from the user input relating to the at least one DIMM to be inserted into a DIMM slot of the plurality of DIMM slots; and
visually indicating, with the visual indicators, a DIMM slot amongst the plurality of DIMM slots to which the at least one DIMM is to be installed in accordance with the DIMM population rule.

12. The method of claim 11, further comprising the BMC checking whether the plurality of DIMM slots are populated by DIMMs in accordance with the DIMM population rule.

13. The method of claim 12, wherein in response to a positive checking result of the BMC, further comprising the plurality of visual indicators visually indicating completion of populating the plurality of DIMM slots in accordance with the DIMM population rule.

14. The method of claim 11, further comprising the BMC operating a field-programmable gate array (FPGA) to determine presence of a DIMM at least one of the plurality of DIMM slots, and/or location information of at least one of the plurality of DIMM slots.

15. The method of claim 11, wherein the information relating to the at least one DIMM includes quantity and/or type of the at least one DIMM.

16. The method of claim 11, wherein in response to receiving the information relating to the DIMM, further comprising the BMC causing one of the visual indicators to visually indicate the DIMM slot amongst the plurality of DIMM slots to which the DIMM is to be installed.

17. The method of claim 11, wherein the information relating to the at least one DIMM is provided to the BMC by scanning.

18. The method of claim 11, wherein in response to the BMC determining that the DIMM population rule is invalid, further comprising the one or more visual indicators visually indicating that the DIMM population rule is invalid.

19. The mainboard of claim 1, wherein the BMC is further adapted to, in response to the DIMM installation request, disable power to the DIMM slots.

20. The method of claim 11, further comprising disabling, with the BMC, power the DIMM slots in response to the DIMM installation request.

* * * * *